2,996,514
Patented Aug. 15, 1961

2,996,514
METHOD OF PRODUCING AROMATIC COMPOUNDS SUBSTITUTED BY HYDROCARBON GROUPS IN THE NUCLEUS
Cornelis Johannes Schoot, Klaas Hinderikus Klaassens, and Johannes Jacobus Ponjee, all of Eindhoven, Netherlands, assignors to North American Philips Company, Inc., New York, N.Y., a corporation of Delaware
No Drawing. Filed Sept. 18, 1958, Ser. No. 761,673
Claims priority, application Netherlands Oct. 3, 1957
3 Claims. (Cl. 260—329)

Various methods are known for introducing hydrocarbon groups into the nucleus of an aromatic compound, of which methods that by Friedel-Crafts is the commonest.

An entirely new method has now been developed, in which by means of the metaphosphoric acid esters concerned one or more saturated or unsaturated aliphatic, aliphatic-aromatic, or alicyclic hydrocarbon groups can be introduced into the nucleus of aromatic compounds.

The present invention concerns a method for producing aromatic compounds substituted in the nucleus by one or more saturated or unsaturated, whether or not substituted, aliphatic, aliphatic-aromatic or alicyclic hydrocarbon groups, characterized in that an aromatic compound is reacted with a metaphosphoric acid ester of a saturated or unsaturated, whether or not substituted, aliphatic, aliphatic-aromatic or alicyclic alcohol.

Metaphosphoric acid ester can be produced in many different ways, for example from phosphoruspentoxide and ethers.

It has been found advantageous to carry out the method in accordance with the invention so that the metaphosphoric acid is preferred and formed in situ. In particular, the method enters, in which a halide of a saturated or unsaturated, substituted or unsubstituted, aliphatic, aliphatic-aromatic or alicyclic compound is reacted with a metal salt of metaphosphoric acid in the presence of the aromatic compound, in the nucleus of which substitution is to occur.

As halides the iodides are particularly suitable.

As alkyliodides there come into account saturated alkyliodides with at least four carbon atoms such as butyl-, isobutyl, amyl-, isoamyl-, n.hexyl- and n.heptyl-iodide, while allyliodide may, for example, be used as unsaturated iodide. Suitable aralkyliodides are, for example, benzyliodide, while cyclohexyliodide is, for example, suitable as cycloalkyliodide.

Appropriate aromatic compounds are benzene and naphthalene and derivatives substituted in the nucleus by hydrocarbon groups, in particular alkyl groups with 1 to 4 carbon atoms, preferably methyl groups such as toluene, dimethyl- and trimethylbenzene; benzene substituted by halogen atoms, for example chlorobenzene, and in particular benzene and naphthalene substituted by alkoxy-, aralkoxy- or aryloxy groups, in particular by methoxy groups, for example methoxy- and dimethoxybenzene and methoxynaphthalene.

In particular, thiophene and derivatives further come into account as aromatic compounds. The method according to the invention is different from the known method by Friedel-Crafts. In the last-mentioned method, ether- and thioether bonds are often split up under the influence of the condensation agent aluminiumchloride. The present method does not suffer from this limitation; ether- and thioether compounds are practically not attacked.

As metal salts of metaphosphoric acid come into account those of the metals of the side periods of the periods IV, V and VI and of group VIII of the periodic table of elements and those of manganese, in particular those of the group comprising silver, zinc, cadmium, copper, mercury, tin and lead. A smooth and complete reaction is obtained particularly when using salts of the metals silver, zinc and cadmium, in particular those of silver.

The method, in which the metaphosphoric acid esters are formed in situ may be so carried out that the halide and the metaphosphate are mixed with the aromatic compound and the whole is subsequently warmed to the desired reaction temperature. Alternatively, a mixture of the halide and the aromatic compound may be warmed to the reaction temperature, subsequently to which the metaphosphate may be added while stirring.

If the reaction components are mixed previously, it is of importance to raise the temperature slowly at the outset in order to prevent decomposition of the intermediary metaphosphoric acid ester with the formation of non-reactive unsaturated compounds. When using esters of metaphosphoric acid and lower aliphatic alcohols this composition is noticeable by development of gas. In order to prevent decomposition, local overheating should also be avoided. In practice, consequently, the reaction mixture should be stirred vigorously and, if required, heated indirectly. It may be preferable to add one of the compounds, for example the metal salt of metaphosphoric acid, gradually or by small amounts to the reaction mixture at reaction temperature.

The researches conducing to the invention revealed that the metal halide, separates out prior to the substitution-reaction of the aromatic compound taking place. It is not necessary to remove the separated metal halide from the reaction mixture, since it has been found that it does not affect or does not materially affect the result.

In the method, in which the metaphosphoric acid esters are formed in situ from a metal salt and a halide, a heterogeneous reaction is concerned, since the metal salt is present in the solid state. For smooth and complete conversion the metal salt should be used in a finely divided state. In general, the reaction of the metal salt and the halide occurs already at a temperature which may be considerably lower than that at which substitution occurs in the aromatic nucleus. As a rule, the reaction of the metal salt and the halide proceeds rapidly and quantitatively under the reaction conditions. Therefore, it is not necessary or desirable to use the metal salt or the halide in excess, hence preferably equivalent quantities of the metal salt of metaphosphoric acid and of the halide are used.

The reaction should occur in a substantially anhydrous medium. This involves that the reaction components should be completely or substantially anhydrous, hence the crystal water should be completely or almost completely removed from crystal water-containing metaphosphates before use. This may be effected by heating, preferably at reduced pressure. Since the crystallized silver salts of metaphosphoric acid do not contain crystal water these salts are to be preferred also for this reason.

As an alternative, the reaction may be carried out in the presence of a diluent which is a solvent for the aromatic compound. As indifferent diluents there may be used high-boiling aliphatic hydrocarbons, further nitropropane, aromatic hydrocarbons and nitrobenzene, aliphatic ethers, for example dibutylether, aliphatic esters such as butyl acetate.

It has further been found that an excess of the aromatic compound to be treated may be used satisfactorily as a diluent, such an excess being beneficial to the yield.

Infrared-spectrophotomatric analysis of the products obtained by the method according to the invention shows that chiefly para-substituted compounds are formed from mono-substituted benzene derivatives. The use of such an aromatic compound in excess yields substantially pure para-substituted products. If substitution in para-position is not possible, for example with 1.4-dimethoxybenzene, substitution in ortho-position mainly occurs.

The reaction temperature slightly depends upon the reactivity of the compounds used. In general, the final temperature of the reaction will be under 200° C.

In order that the invention may readily be carried into effect several examples will now be described in detail.

EXAMPLE I

Production of isoamylmethoxybenzene

In this example, the metaphosphoric acid ester is formed from benzylisoamylether and phosphorus pentoxide.

In a round-bottomed flask having a capacity of 150 cc. equipped with a reflux condenser provided with a tube with calcium chloride a suspension of 28.6 g. (0.2 mole) of phosphoruspentoxide in a mixture of 35.6 g. (0.2 mole) of benzylisoamylether and 41.6 g. (0.4 mole) of anisol was carefully heated up to approximately 150° C. The phosphoruspentoxide dissolved slowly and an oily layer deposited at the bottom.

After complete dissolution of the pentoxide, the aforesaid liquid was decanted and distilled after cooling anisol and diamylene (24 g.) distilling over to 160° C. thence 27.5 g. of isoamylmethoxybenzene distilled at 280° C.–290° C.

EXAMPLE II

Production of amylmethoxybenzene 374 g. (2 moles) of silvermetaphosphate are introduced into a round-bottomed flask having a capacity of 2 litres and containing a mixture of 300 g. (approximately 3 moles) of anisole and 396 g. (2 moles) of amyliodide, while stirring. Mixing evolves a little heat. Subsequently, the reaction flask is carefully warmed on an oil bath. The temperature of the reaction mixture is slowly raised so that practically no gas develops. Finally a temperature of 160° C. is maintained for some time. The overall reaction time is approximately two hours. By steam distillation the excess of anisole and the produced amylmethoxybenzene are removed from the reaction mixture. The distillate is extracted with ether. The ether is evaporated from the extract, whence first the anisole and then the reaction product obtained are distilled in vacuo. The amylmethoxybenzene distillates between 120° C. and 130° C. at a pressure of 8 mm. of mercury. Yield 206 g., that is 58% based on the amyliodide used.

EXAMPLE III

Production of n.hexylmethoxybenzene

A mixture of 500 g. (approximately 5 moles) of anisol and 212 g. (1 mole) of n.hexyliodide in a litre flask is heated at a temperature of 150° C. in an electric heater. Whilst stirring, a quantity of 187 g. (1 mole) of silvermetaphosphate is added by small amounts in half an hour so that gas just does not develop. After adding the silvermetaphosphate further warming occurs at 150° C. for well over one hour. Subsequently, the reaction mixture is subjected to steam distillation so that first the excess of anisole and then the produced hexylmethoxybenzene distil. The distillate is extracted with ether and the extract is worked up similarly to Example II. The boiling point of the product is 111° C. to 119° C. at a pressure of 8 mm. of mercury. Yield 120 g., that is 62.5%, based on the quantity of hexyliodide used.

EXAMPLE IV

Production of cyclohexyldimethoxybenzene

A mixture of 211 g. (1 mole cyclohexyliodide), 200 g. (approximately 1.5 mole) of 1.4-dimethoxybenzene and 187 g. (1 mole) of silvermetaphosphate are carefully warmed, while stirring, in a litre flask till refluxing of cyclohexyliodide starts. After three hours warming th reaction mixture is cooled to approximately 20° C. an subsequently extracted with ether. The ether is evapo rated from the ethereal extract, the excess of reactioi components is distilled off, thence the cyclohexyldimeth oxybenzene produced is distilled in vacuo. Boiling poin 157° C. at a pressure of 8 mm. of mercury. Yield 13: g., that is 61.5% based on the quantity of cyclohexylio dide used.

EXAMPLE V

Production of cyclohexylmethoxybenzene

In a two-necked flask having a capacity of 100 cc. comprising a stirrer and a cooler provided with a tube with calcium chloride a suspension of 18.7 g. (0.1 mole) of silvermetaphosphate in a mixture of 21 g. (0.1 mole) of cyclohexyliodide, 20 g. (0.2 mole) of anisole and 50 cc. of nitropropane is carefully brought to boiling and subsequently further heated for 3 hours under reflux of the solvent. After cooling, the reaction mixture was distilled with steam. The distillate was extracted with ether and the ethereal solution dried with sodium sulphate. After distilling off the ether, anisole and nitropropane were removed by distillation. Subsequently, the cyclohexylmethoxybenzene produced was distilled. Yield 9.4 g. that is 50%, based on the quantity of cyclohexyliodide used. Boiling point 124° C. to 126° C. at a pressure of mm. of mercury.

Similarly as described with reference to Examples II—V the compounds referred to in the table below were reacted in the presence of silvermetaphosphate. The quantity of silvermetaphosphate used was invariably equivalent to the quantity of iodide used.

The excess of aromatic compound was varied as stated. In the table there are further listed the reaction temperature, the reaction time, the yields and the boiling points of the products obtained. The yield is invariably calculated on the basis of the products obtained. The yield is invariably calculated on the basis of the quantity of aliphatic, aralkyl or alicyclic iodide.

TABLE

| RI, (0.1 mol) | Aromatic Compound (0.15 mol) | Reaction temperature, ° C. | Reaction time in hours | Yield, Percent | Boiling point product, ° C./mm. |
|---|---|---|---|---|---|
| VI. Isobutyl iodide. | anisole | 160 | 2 | 34 | 87–90/8 |
| VII. n.heptyl-iodide. | do | 160 | 2 | 18 | 124–125/8 |
| VIII. allyliodide. | do | 150 | 1 | 40 | viscous oil |
| IX. benzyl-iodide. | do | 160 | 2 | 41 | 155–158/8 |
| X. cyclohexyl-iodide. | 1,3-dimethyl benzene. | 160 | 2 | 39 | 90–130/8 |
| XI. cyclohexyl-iodide. | toluene | 160 | 3 | 50 | 110–120/8 |
| XII. cyclohexyliodide. | benzene | 160 | 3 | 44 | 92–94/8 |
| XIII. cyclohexyliodide. | 1-methoxy-naphthalene. | 160 | 3 | 29 | 160–205/8 |
| XIV. cyclohexyliodide. | 2-methoxy-naphthalene. | 180 | 3 | 21 | 170–180/1.5 |
| XV. cyclohexyliodide. | thiophene | reflux | 3 | 25 | 87–90/8 |
| (0.5 mol) | | | | | |
| XVI. cyclohexyliodide. | anisole | 150 | 2 | 68 | 130–140/12 |
| XVII. n.hexyl iodide. | do | 150 | 2 | 63 | 110–115/10 |
| XVIII. n.hexyl-iodide. | do | 150 | 2 | 78 | 115–120/20 |
| XIV. iso.amyl-iodide. | do | 150 | 2 | 82 | 103–104/8 |
| (0.2 mol) | | | | | |
| XX. iso. amyl-iodide. | anisole | 150 | 2 | 34 | 103/8 |

What is claimed is:

1. A process for the production of nuclear substituted aromatic compounds comprising the steps of heating, at a temperature from about the reflux temperature to about 200° C., a mixture of an aromatic compound containing at least one free nuclear hydrogen and selected from the group consisting of benzene, thiophene, naphthalene and lower alkyl, chloro and methoxy derivatives thereof with an iodide selected from the group consisting of alkyl iodides containing at least four carbon atoms, allyl iodide, benzyl iodide and cyclohexyl iodide in the presence of a salt of metaphosphoric acid and a metal selected from the group consisting of manganese, silver, zinc, cadmium, copper, mercury, tin and lead and separating out the resultant nuclear substituted aromatic compound.

2. The process of claim 1 in which an inert solvent for the aromatic compound is employed.

3. The process of claim 1 in which the salt of the metaphosphoric acid is silver metaphosphate.

References Cited in the file of this patent

UNITED STATES PATENTS

| | | |
|---|---|---|
| 2,147,256 | Ipatieff et al. | Feb. 14, 1939 |
| 2,290,211 | Schaad | July 21, 1942 |
| 2,442,878 | Schmerling et al. | June 8, 1948 |
| 2,618,614 | Bielawski et al. | Nov. 18, 1952 |

OTHER REFERENCES

Adams et al.: Organic Reactions, volume III (1956), pages 4, 26, 47, 50 and 53.